United States Patent [19]

Fraioli

[11] Patent Number: 4,819,216
[45] Date of Patent: Apr. 4, 1989

[54] INTEGRATED HYDROPHONE PREAMPLIFIER TELEMETRY ASSEMBLY

[75] Inventor: Dominic Fraioli, Waterford, Conn.

[73] Assignee: The United States of America as represented by the Secretary of the Navy, Washington, D.C.

[21] Appl. No.: 481,173

[22] Filed: Apr. 1, 1983

[51] Int. Cl.⁴ .................................................. G01V 1/38
[52] U.S. Cl. ......................................... 367/154; 367/20
[58] Field of Search .................. 367/134, 153, 154, 20, 367/178, 130, 141, 159, 155; 310/367, 369

[56] References Cited

U.S. PATENT DOCUMENTS

| | | | |
|---|---|---|---|
| 3,893,063 | 7/1975 | Park et al. | 367/130 |
| 3,939,466 | 2/1976 | Horwath | 367/153 |
| 4,228,532 | 10/1980 | Sims | 367/155 |
| 4,408,488 | 10/1983 | Marshall | 367/134 |
| 4,464,739 | 8/1984 | Moorcroft | 367/20 |
| 4,521,875 | 6/1985 | Harrington | 367/130 |

OTHER PUBLICATIONS

Tims, A. C., "A New Capped Cylinder Design . . .", Journal of the Acoustical Society of America, vol. 51, #5, 1972, pp. 1751-1754.
Baggeroer et al., "DATS-Digital Acoustic Telemetry . . .", 1981, Oceans Conference (4/16-18/81) Record, pp. 55-60.

Primary Examiner—Thomas H. Tarcza
Assistant Examiner—Ian J. Lobo
Attorney, Agent, or Firm—Arthur A. McGill; Prithvi C. Lall; Michael J. McGowan

[57] ABSTRACT

For a simplified towed array configuration an integrated hydrophone, preamplifier and telemetry hybrid unit suitable for connecting with a single coaxial cable was developed. The preamplifier and FM hydrophone telemetry assembly comprises an air backed ceramic assembly connected to a preamplifier/voltage control oscillator chip. In addition the chip includes a regulator and power separation network.

3 Claims, 1 Drawing Sheet

INTEGRATED HYDROPHONE PREAMPLIFIER TELEMETRY ASSEMBLY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention generally relates to acoustic arrays that are towed by ships in water. More particularly the invention deals with the arrangement of components within such an array so as to provide improved performance at less cost and bulk.

(2) Description of the Prior Art

In a typical fleet array configuration the conditioning and telemetry units, the hydrophones, and the preamplifiers are separately contained and are hard wired using a wiring harness. This tends to create acoustic noise scattering which interferes with what is normally a weak target signal that is to be detected. In addition, end caps are necessarily numerous and create additional source of interfering noise.

SUMMARY OF THE INVENTION

The present invention comprises a hybrid hydrophone that combines preamplifier, conditioning and telemetry circuits, on an integrated circuit chip that is embedded inside the hydrophone. It results in the construction of a low scattering module for increased performance.

DESCRIPTION OF THE PREFERRED EMBODIMENT

Figure 1:
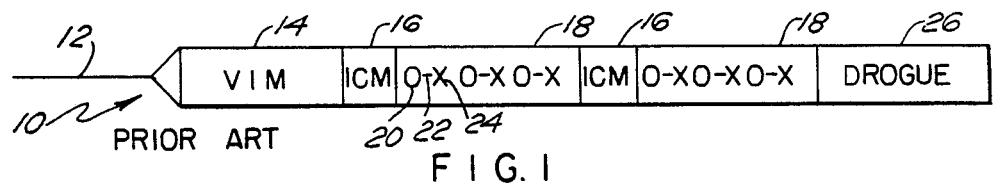
FIG. 1 is a prior art arrangement of an array that has received widespread use in the fleet.

Referring now to FIG. 1 there is shown a prior art towed array 10 having a tow cable 12 attached to the array 10. A vibration isolation module 14 as the name implies is used to isolate any tow cable vibration from the remainder of the array 10. An inter-connection module 16 comprises a pair of connectors with electrical wiring in between. The acoustic and telemetry module 18 has a plurality of hydrophone units 20, preamplifier units 22 and telemetry units 24 that are respectively hard wired to each other. At the aft end of the array is a typical drogue 26 that provides stability to the array 10.

Figure 2:
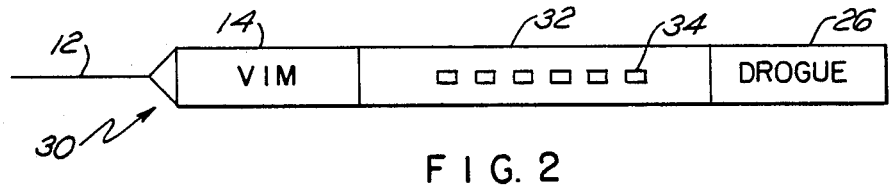
FIG. 2 is an arrangement of an array in accordance with the present invention.

FIG. 2 is a diagram showing the location of components in the present invention. An array 30 has similar tow cable 12, vibration isolation model 14 and drogue 26 to that previously explained. The acoustic and telemetry module 32 differs substantially from the module 18 previously described. The module 32 has a plurality of hybrid hydrophones 34 not found in the prior art.

Figure 3:
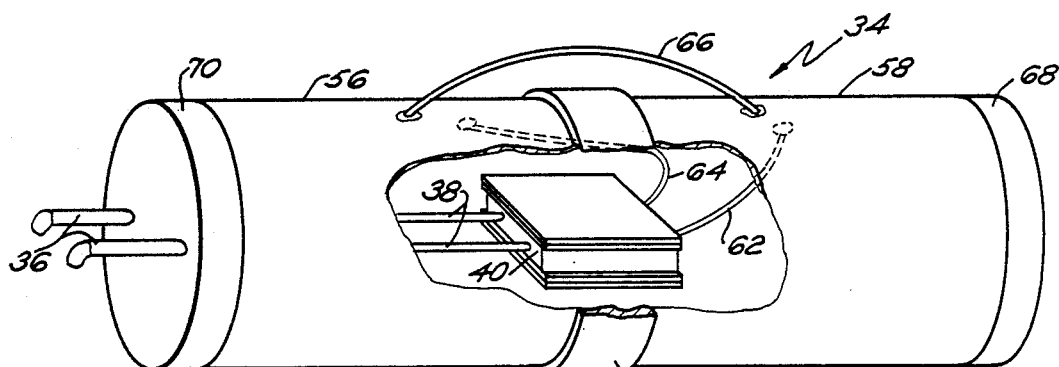
FIG. 3 is a cutaway view of a hybrid hydrophone used in the array of FIG. 2.
Figure 4:
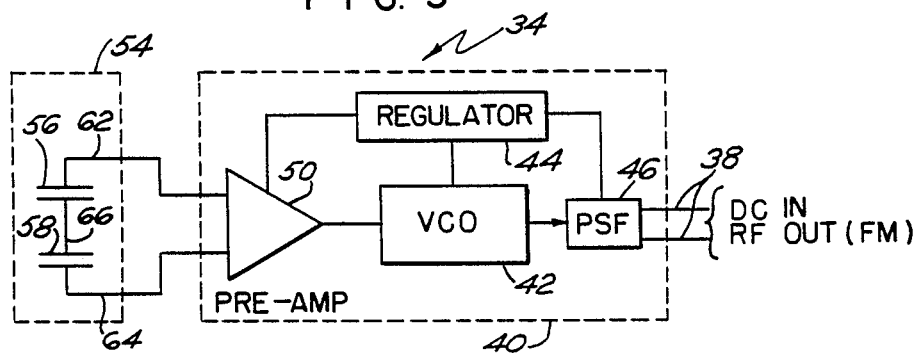
FIG. 4 is a simplified schematic-block diagram of the hybrid hydrophone of FIG. 3.
Figure 5:
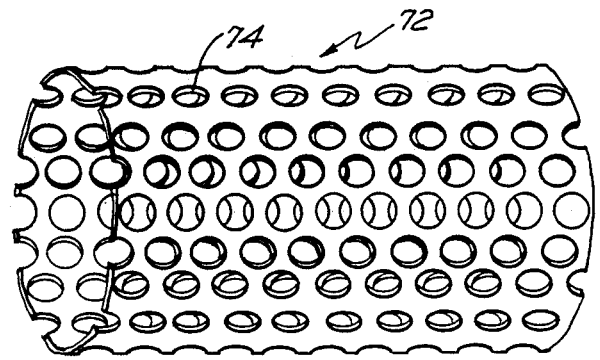
FIG. 5 is an electrostatic shield suitable for enclosing the hybrid hydrophone of FIG. 3.

Refer now to FIGS. 3 and 4 for a description of the hybrid hydrophone 34. The hydrophone 34 comprises terminal pins 36 having connecting wires 38 going to an integrator circuit chip 40 that includes a voltage controlled oscillator 42, a regulator 44, a power separation filter 46 and a preamplifier 50. The voltage controlled oscillator 42, the regulator 44 and the power separation filter 46 comprise the conditioning and telemetry unit. The chip 40 is connected to the air backed ceramic assembly 54 that comprises ceramic acoustic sensors 56 and 58 separated by a metallic mounting ring 60. The interconnecting wires between the chip 40 and serially wired sensors 56 and 58 are labeled 62, 64 and 66. A metallic end cap 68 encloses one end and end cap 70 made of metal enclosing glass forms the other end. A grounded brass electrostatic shield 72 having apertures 74 is shown in FIG. 5 and can be used to enclose the assembly 34.

There has therefore been described a hybrid hydrophone for use in a towed array to improve array performance by permitting a truly low profile module that eliminates complicated wiring harnesses and integrates what were previously separate internal components into a single enclosed unit enclosed by the walls of the hydrophone sensor.

It will be understood that various changes in details, materials, steps and arrangement of part, which have been herein described and illustrated in order to explain the nature of the invention may be made by those skilled in the art within the principle and scope of the invention as expressed in the appended claims.

What is claimed is:

1. A hydrophone system adapted for use in a towed array comprising:
    a plurality of cylindrical air backed ceramic acoustic sensors having a common longitudinal axis, said sensors are spaced along said common longitudinal axis and are electrically connected in series;
    a metallic mounting ring having said common longitudinal axis connecting to said cylindrical air backed ceramic acoustic sensors and forming the spacing between said cylindrical air backed ceramic acoustic sensors;
    an integrated circuit chip including a preamplifier, and a conditioning and telemetry circuit, said integrated circuit chip being located inside the inner cylindrical walls of said sensors and said metallic ring, said integrated circuit chip being electrically connected to said sensors; and
    first and second end caps with said first end cap connecting to one end of said plurality of cylindrical air backed ceramic acoustic sensors and said second end cap connecting to the other end of said plurality of cylindrical air backed acoustic sensors, one of said first and second end caps having terminal pins electrically connected to said integrated circuit chip.

2. A hydrophone system according to claim 1 wherein said conditioning and telemetry circuit includes a voltage controlled oscillator, a regulator and a power separation filter.

3. A hydrophone system according to claim 2 further comprising a cylindrical electrostatic shield having said common axis and located radially outward from said plurality of cylindrical air backed ceramic acoustic sensors.

* * * * *